(12) United States Patent
Weder (10) Patent No.: US 6,564,507 B2
(45) Date of Patent: *May 20, 2003

(54) METHOD FOR WRAPPING A FLORAL GROUPING WITH A SHEET OF MATERIAL HAVING PRINTED AND EMBOSSED PATTERNS THEREON

(75) Inventor: Donald E. Weder, Highland, IL (US)

(73) Assignee: Southpac Trust International, Inc., Rarotonga (CK)

( * ) Notice: Subject to any disclaimer, the term of this patent is extended or adjusted under 35 U.S.C. 154(b) by 0 days.

This patent is subject to a terminal disclaimer.

(21) Appl. No.: 10/183,786

(22) Filed: Jun. 26, 2002

(65) Prior Publication Data

US 2002/0166285 A1 Nov. 14, 2002

Related U.S. Application Data

(63) Continuation of application No. 10/051,828, filed on Jan. 17, 2002, now abandoned, which is a continuation of application No. 09/606,812, filed on Jun. 28, 2000, now Pat. No. 6,347,480, which is a continuation-in-part of application No. 08/888,813, filed on Jul. 7, 1997, now abandoned.

(51) Int. Cl.$^7$ ................................................. A47G 7/02
(52) U.S. Cl. ...................................................... 47/41.01
(58) Field of Search .................... 47/72, 41.01; 53/397, 53/410, 411; 706/423

(56) References Cited

U.S. PATENT DOCUMENTS

| | | |
|---|---|---|
| 682,817 A | 9/1901 | Shaner |
| 732,889 A | 7/1903 | Paver |
| 898,273 A | 9/1908 | Silger et al. |
| 1,446,563 A | 2/1923 | Hughes |
| 1,525,015 A | 2/1925 | Weeks |
| 1,818,198 A | 8/1931 | Davis |
| 1,850,856 A | * 3/1932 | Weindel, Jr. ................ 101/32 |
| 1,863,216 A | 6/1932 | Wordingham |
| 1,868,283 A | 7/1932 | Fleischer |
| 1,962,722 A | 6/1934 | Krueger |
| 1,978,631 A | 10/1934 | Herrlinger |
| 2,028,878 A | 1/1936 | Rider |
| 2,048,123 A | 7/1936 | Howard |

(List continued on next page.)

FOREIGN PATENT DOCUMENTS

| | | |
|---|---|---|
| DE | 345464 | 2/1917 |
| FR | 2610604 | 8/1988 |
| GB | 2255110 A | 10/1992 |
| JP | 6-143466 | * 6/1994 |
| JP | 07165255 A | 6/1995 |
| JP | 2000-62053 | * 2/2000 |
| WO | WO-91/14998 A1 | 12/1990 |

OTHER PUBLICATIONS

Speed Cover® Brochure, 1989, Highland Supply Corp. Highland, IL.
Speed Sheets™ and Speed Rolls, 1990, Highland Supply Corp, Highland, IL.

Primary Examiner—Peter M. Poon
Assistant Examiner—Jeffrey L. Gellner
(74) Attorney, Agent, or Firm—Dunlap, Codding & Rogers, P.C.

(57) ABSTRACT

A decorative wrapper for a floral grouping or flower pot wherein a sheet of material having embossed and printed patterns thereon is wrapped about at least a portion of the floral grouping or flower pot. The printed pattern may be in or out of register with the embossed pattern, or a portion of the printed and embossed patterns may be in register with one another and a portion of the printed and embossed patterns may be out of register with one another. The sheet of material may be provided in the form of a pad containing a plurality of sheets of material or in the form of a roll wherein the sheets of material are separable from the roll of material.

84 Claims, 6 Drawing Sheets

U.S. PATENT DOCUMENTS

| | | |
|---|---|---|
| 2,094,349 A | 9/1937 | Carlson |
| RE21,065 E | 5/1939 | Copeman |
| 2,170,147 A | 8/1939 | Lane |
| 2,278,673 A | 4/1942 | Savada et al. |
| 2,294,670 A | 9/1942 | Krueger |
| 2,302,259 A | 11/1942 | Rothfuss |
| 2,337,808 A | 12/1943 | Ford |
| 2,355,559 A | 8/1944 | Renner |
| 2,371,985 A | 3/1945 | Freiberg |
| 2,377,295 A | 5/1945 | Cook |
| 2,411,328 A | 11/1946 | MacNab |
| 2,435,739 A | 2/1948 | Cutler |
| 2,469,030 A | 5/1949 | Brown |
| 2,510,120 A | 6/1950 | Leander |
| 2,529,060 A | 11/1950 | Trillich |
| 2,540,090 A | 2/1951 | Brackney |
| 2,546,522 A | 3/1951 | Quackenbush |
| 2,552,948 A | 5/1951 | Ferrato |
| 2,577,183 A | 12/1951 | Denton |
| 2,605,740 A | 8/1952 | Taylor et al. |
| 2,621,142 A | 12/1952 | Wetherall |
| 2,782,756 A | 2/1957 | Hunt |
| 2,806,443 A | 9/1957 | Horn et al. |
| 2,822,287 A | 2/1958 | Avery |
| 2,846,060 A | 8/1958 | Yount |
| 2,850,842 A | 9/1958 | Eubanks, Jr. |
| 2,883,262 A | 4/1959 | Borin |
| 3,022,605 A | 2/1962 | Reynolds |
| 3,034,476 A | 5/1962 | Didde et al. |
| 3,057,326 A | 10/1962 | Jeddeloh |
| 3,121,647 A | 2/1964 | Harris et al. |
| 3,130,113 A | 4/1964 | Silman |
| 3,271,922 A | 9/1966 | Wallerstein |
| 3,368,522 A | 2/1968 | Cordis |
| 3,376,666 A | 4/1968 | Leonard |
| 3,431,706 A | 3/1969 | Stuck |
| 3,455,274 A | 7/1969 | Modersohn |
| 3,508,372 A | 4/1970 | Wallerstein |
| 3,620,366 A | 11/1971 | Parkinson |
| 3,681,105 A | 8/1972 | Milutin et al. |
| 3,754,642 A | 8/1973 | Stidolph |
| 3,767,104 A | 10/1973 | Bachman et al. |
| 3,793,799 A | 2/1974 | Howe et al. |
| 3,924,561 A | 12/1975 | Ruthart et al. |
| 4,054,697 A | 10/1977 | Reed et al. |
| 4,118,890 A | 10/1978 | Shore |
| 4,216,620 A | 8/1980 | Weder et al. |
| 4,271,221 A * | 6/1981 | Hosmer ..................... 428/172 |
| 4,280,314 A | 7/1981 | Stuck |
| 4,297,811 A | 11/1981 | Weder |
| 4,300,312 A | 11/1981 | Weder et al. |
| 4,333,267 A | 6/1982 | Witte |
| 4,380,564 A | 4/1983 | Cancino et al. |
| 4,413,725 A | 11/1983 | Bruno et al. |
| 4,498,390 A | 2/1985 | Bowling et al. |
| 4,546,875 A | 10/1985 | Zweber |
| 4,621,733 A | 11/1986 | Harris |
| 4,640,079 A | 2/1987 | Stuck |
| 4,659,608 A | 4/1987 | Schulz |
| 4,660,502 A | 4/1987 | Scott |
| 4,733,521 A | 3/1988 | Weder et al. |
| 4,765,464 A | 8/1988 | Ristvedt |
| 4,773,182 A | 9/1988 | Weder et al. |
| 5,111,637 A | 5/1992 | Weder et al. |
| 5,111,638 A | 5/1992 | Weder |
| 5,181,364 A | 1/1993 | Weder |
| 5,245,814 A | 9/1993 | Weder |
| 5,249,407 A | 10/1993 | Stuck |
| 5,335,475 A | 8/1994 | Weder et al. |
| 5,335,476 A | 8/1994 | Weder |
| 5,369,934 A | 12/1994 | Weder |
| 5,381,642 A | 1/1995 | Weder et al. |
| 5,388,386 A | 2/1995 | Weder |
| 5,415,918 A | 5/1995 | Lang et al. |
| 5,436,057 A * | 7/1995 | Schulz ..................... 428/156 |
| 5,448,875 A | 9/1995 | Weder |
| 5,723,200 A * | 3/1998 | Oshima et al. ............. 428/172 |
| 5,752,360 A | 5/1998 | Weder |

* cited by examiner

METHOD FOR WRAPPING A FLORAL GROUPING WITH A SHEET OF MATERIAL HAVING PRINTED AND EMBOSSED PATTERNS THEREON

RELATED REFERENCES

The present application is a continuation of U.S. Ser. No. 10/051,828, filed Jan. 17, 2002, now abandoned; which is a continuation of U.S. Ser. No. 09/606,812, filed Jun. 28, 2000, now U.S. Pat. No. 6,347,480, issued Feb. 19, 2002; which is a continuation-in-part of U.S. Ser. No. 08/888,813, filed Jul. 7, 1997, now abandoned.

FIELD OF THE INVENTION

The present invention relates generally to methods for wrapping floral groupings or flower pots wherein the floral grouping or flower pot is wrapped with a sheet of material having a pattern embossed thereon and a pattern printed thereon.

DESCRIPTION OF THE PREFERRED EMBODIMENTS

Embodiment of FIGS. 1–5

Figure 1:
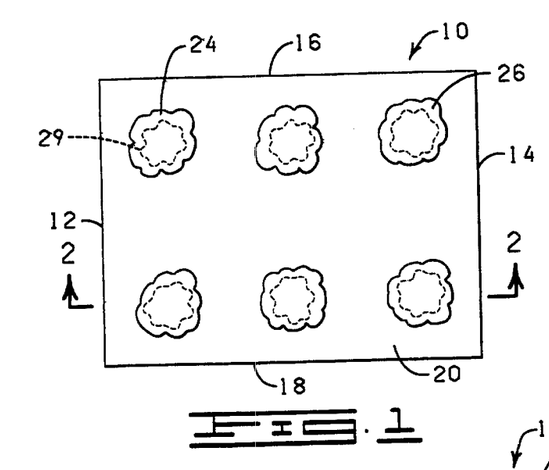
FIG. 1 is a plan view of a sheet of material constructed in accordance with the present invention.
Figure 2:
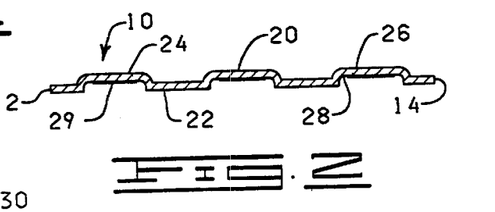
FIG. 2 is a sectional view of the sheet of material shown in FIG. 1 taken substantially along the lines 2—2 of FIG. 1.
Figure 3:
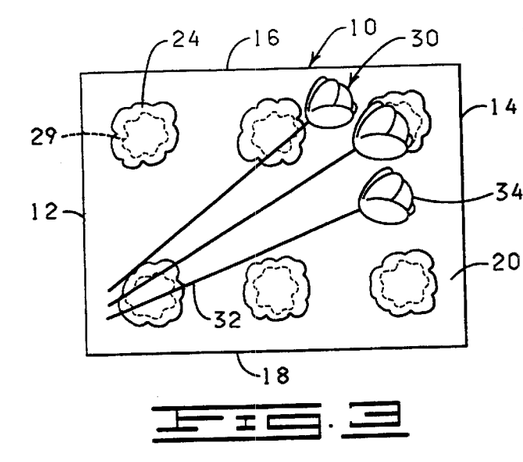
FIG. 3 is a plan view of the sheet of material of FIGS. 1 and 2 showing a floral grouping disposed thereon prior to the sheet of material being wrapped about the floral grouping.

Shown in FIGS. 1–3 is a sheet of material 10 constructed in accordance with the present invention. The sheet of material 10 may be constructed of any material which is suitable for use with the present invention. That is, the sheet of material 10 may be constructed of any flexible material capable of being wrapped about a floral grouping or flower pot. Examples of materials from which the sheet of material 10 may be constructed include paper, polymeric film, metallized film, foil, and laminations and combinations thereof. Preferably, the sheet of material 10 is constructed of paper.

The sheet of material 10 shown in FIG. 1 is rectangular shaped, although the sheet of material 10 may be any other shape, such as square, elliptical or round, or may be die cut into any shape, such as a rose shape. The sheet of material 10 has a first side 12, second side 14, a first end 16, a second end 18, an upper surface 20 and a lower surface 22 (FIG. 2).

An embossed pattern 24 is formed on at least a portion of one of the upper surface 20 and the lower surface 22 of the sheet of material 10. The embossed pattern 24 may be any one of a number of patterns such as depictions of flowers or logos or meaningless designs, for example. The embossed pattern 24 forms a plurality of spaced apart raised portions 26 in the upper surface 20 of the sheet of material 10 (only one of the raised portions 26 is designated with the reference numeral in FIGS. 1 and 2). The embossed pattern 24 also forms a plurality of corresponding depressed portions 28 (only one of the depressed portions 28 being designated with the reference numeral in FIG. 2) in the lower surface 22 of the sheet of material 10. Each of the depressed portions 28 corresponds to one of the raised portions 26. The embossed pattern 24 may cause the raised portions 26 and the corresponding depressed portions 28 to be uniformly raised and depressed, or each of the raised portions 26 and corresponding depressed portions 28 may include portions raised and depressed to different heights as may be desired in a particular application.

The embossed pattern 24 of the sheet of material 10 provides more rigidity as compared to an unembossed sheet of material, such that a lighter material can serve the same purpose as compared to heavier sheets of material. Further, the embossed sheets of material 10 described herein give the appearance in a roll or a stack of more material or volume of material being contained in such roll or stack. The embossing of the sheets of material 10 to provide the embossed pattern 24 also adds strength to the material. In addition, the embossing of the sheets of material 10 provides more absorbency per square inch as compared to unembossed sheets of material, and thus the embossed sheets of material 10 described herein absorb more moisture or absorb the moisture quicker. The embossed sheets of material 10 also provide an insulating quality due to the air space formed by the embossed pattern 24.

In addition to the embossed pattern 24, the sheet of material 10 may further include a decorative pattern 29 printed on at least a portion of the upper surface 20 of the sheet of material 10, the lower surface 22 of the sheet of material 10 or both the upper and lower surfaces 20 and 22 of the sheet of material if desired. In FIGS. 1 & 2, the decorative printed pattern 29 is depicted as being disposed on the lower surface 22 of the sheet of material 10 and in register with the depressed portions 28 of the embossed pattern 24. The decorative printed pattern 29 may be a solid color or a printed pattern comprising one or more colors. The decorative printed pattern 29 may be in register with the embossed pattern 26 as illustrated in FIGS. 1 and 2, or the decorative printed pattern 29 may be out of register with the embossed pattern 24, or a portion of the decorative printed pattern 29 may be in register with the embossed pattern 24 while a portion of the decorative printed pattern 29 may be out of register with the embossed pattern 24. The upper surface 20 or the lower surface 22 or both the upper & lower surfaces 22 & 24 of the sheet of material 10 may also include a metallic finish.

In operation, the sheet of material 10 is embossed to provide the embossed pattern 24 thereon and printed to provide the printed pattern 29 thereon. A floral grouping 30 (FIGS. 3 and 4) having a stem end 32 and a bloom end 34 is placed on the upper surface 20 of the sheet of material 10 (as shown in FIG. 3). It should be noted that the floral grouping 30 may be placed on the lower surface 22 of the sheet of material 10 if desired in a particular application. The sheet of material 10 then is wrapped about the floral grouping 30 to provide a decorative wrapper 36 (shown in FIG. 4) which encompasses a substantial portion of the floral grouping 30.

Figure 4:
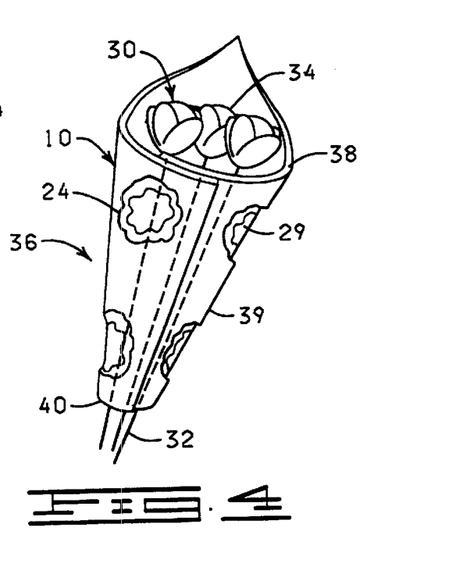
FIG. 4 is a perspective view showing the sheet of material of FIGS. 1–3 wrapped about the floral grouping of FIG. 3.

The decorative wrapper 36 has an upper end 38, a lower end 40 and an outer peripheral surface 39 (FIG. 4). The upper end 38 is opened and the lower end 40 is opened. At least a portion of the embossed pattern 24 and at least a portion of the printed pattern 29 provided on the sheet of material 10 from which the decorative wrapper 36 is constructed are visible on the outer peripheral surface 39 of the decorative wrapper 36. The decorative wrapper 36 encompasses a substantial portion of the floral grouping 30 with the stem end 32 of the floral grouping 30 extending through the open lower end 40 of the decorative wrapper 36. The bloom end 34 of the floral grouping 30 is exposed via the open upper end 38 of the decorative wrapper 36.

Figures 5, 6, 7, 8:
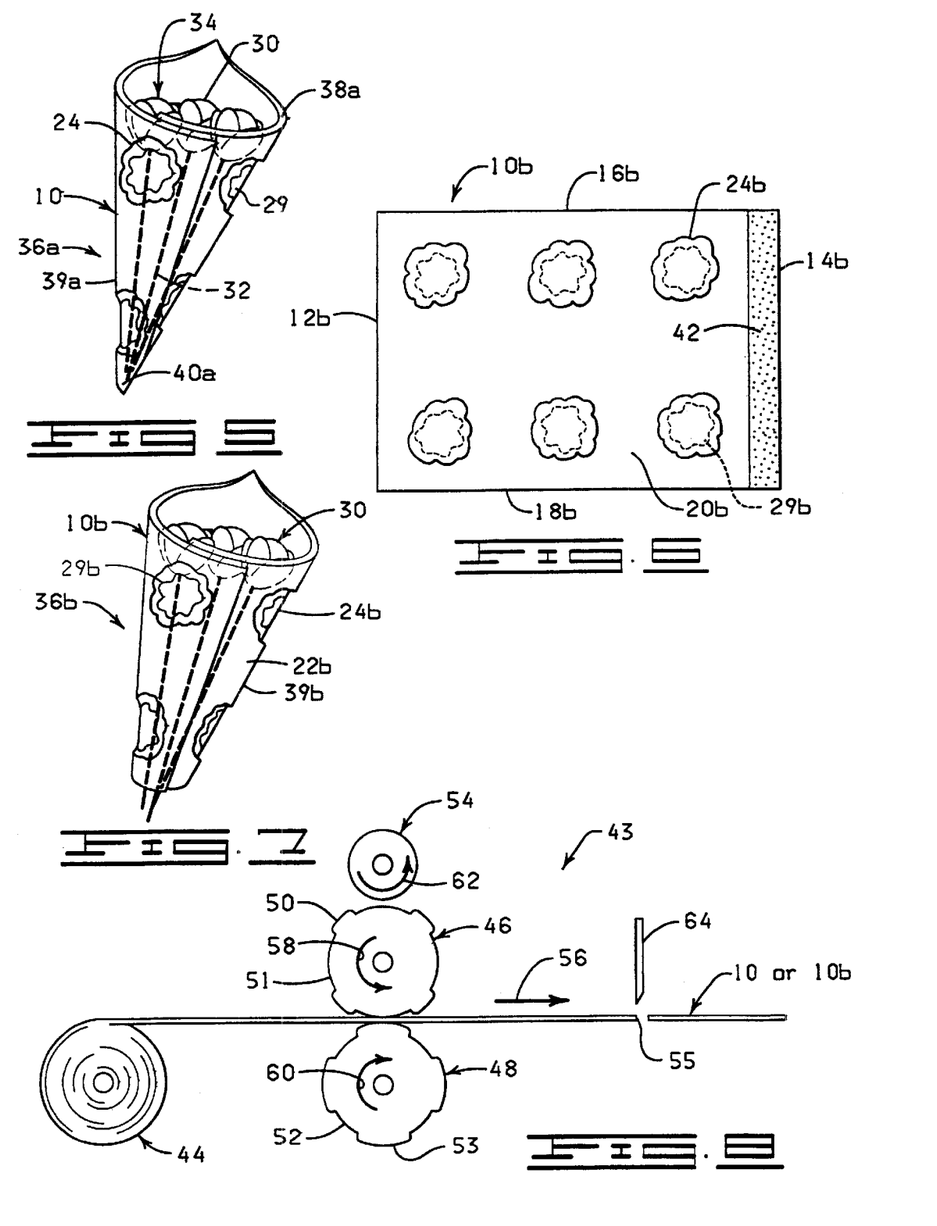
FIG. 5 is a perspective view similar to FIG. 4, but showing the sheet of material of FIGS. 1–3 wrapped about the floral grouping in a different manner as compared to that shown in FIG. 4.
FIG. 6 is a plan view of a sheet of material which is similar to the sheet of material shown in FIG. 1, but having a bonding material disposed thereon.
FIG. 7 is a perspective view showing the sheet of material of FIG. 6 wrapped about a floral grouping.
FIG. 8 is a schematic view illustrating the embossing of a pattern on the sheets of material described herein and showing the printing of a pattern on the sheets of material wherein the printed pattern is in register with the embossed pattern.

In FIG. 5, the sheet of material 10 is wrapped about the floral grouping 30 in a slightly different manner as compared to that described before with respect to FIG. 4 to provide a modified decorative wrapper 36a. The decorative wrapper 36a has an upper end 38a, a lower end 40a and an outer peripheral surface 39a, and at least a portion of the embossed pattern 24 and at least a portion of the printed pattern 29 disposed on the sheet of material 10 from which the decorative wrapper 36a is constructed are visible on the outer peripheral surface 39a of the decorative wrapper 36a.

As shown in FIG. 5, the stem end 32 of the floral grouping 30 does not extend through the lower end 40a of the decorative wrapper 36a, and the bloom end 34 of the floral grouping 30 is disposed below the upper end 38a of the decorative wrapper 36a. The lower end 40a of the decorative wrapper 36a may be closed by simply crimping portions of the sheet of material 10 adjacent the lower end 40a together or by securing the lower end 40a in a closed position by tying a string or ribbon or other securing element or material about the lower end 40a of the decorative wrapper 36a (not shown). The upper end 38a of the decorative wrapper 36a may also be closed in a similar manner if desired in a particular application.

With either the decorative wrapper 36 or the decorative wrapper 36a, the sheet of material 10 is wrapped about the floral grouping 30 to a position wherein a portion of the sheet of material 10 overlaps other portions of the sheet of material 10 to provide the decorative wrapper 36 or 36a with a substantially conically shaped configuration. The decorative wrapper 36 or 36a may be secured in this wrapped position about the floral grouping 30 by taping the overlapping portion of the sheet of material 10 to the adjacent portions of the sheet of material 10, or by bonding the overlapping portion of the sheet of material 10 to the adjacent portions of the sheet of material 10, or by tying a ribbon or string or other binder around the decorative wrapper 36 or 36a to secure the sheet of material 10 in the conically shaped form of the decorative wrapper 36 or 36a if desired in a particular application.

"Floral grouping" as used herein means cut fresh flowers, artificial flowers, a single flower, other fresh and/or artificial plants or other floral materials and may include other secondary plants and/or ornamentation which add to the aesthetics of the overall floral grouping.

Embodiment of FIGS. 6 and 7

Shown in FIG. 6 is a modified sheet of material 10b which is constructed similar to the sheet of material 10 shown in FIGS. 1 and 2 and described in detail before, except as described herein below. The sheet of material 10b is provided with a first side 12b, a second side 14b, a first end 16b, a second end 18b, an upper surface 20b, a lower surface 22b (FIG. 7), an embossed pattern 24b and a printed pattern 29b. In FIGS. 6 & 7, the printed pattern 29b is disposed on at least a portion of the lower surface 22b of the sheet of material 10b, and the printed & embossed patterns 29b & 24b are in register with one another. In addition, the sheet of material 10b also includes a bonding material 42 disposed on a portion of the upper surface 20b thereof near the second side 14b which extends between the first and the second ends 16b and 18b of the sheet of material 10b.

The bonding material 42 preferably is an adhesive or pressure sensitive adhesive material. The bonding material 42 may be a cohesive material; however, in that event, a corresponding strip or spot of cohesive material also must be applied to the lower surface 22b of the sheet of material 10b to connect with the cohesive bonding material 42 on the upper surface 20b of the sheet of material 10b. Alternatively, the bonding material 42 may be applied to at least a portion of the lower surface 22b of the sheet of material 10b.

The term "bonding material" as used herein means an adhesive, preferably a pressure sensitive adhesive, or a cohesive. Where the bonding material 42 is a cohesive, a similar cohesive material must be placed on the adjacent surface of the sheet of material 10b for bondingly contacting and bondingly engaging with the cohesive material. The term "bonding material" also includes materials which are heat sealable and, in this instance, the adjacent portions of the sheet of material 10b must be brought into contact and then heat must be applied to effect the seal. The term "bonding material" as used herein also means a heat sealing lacquer which may be applied to the sheet of material 10b and, in this instance, heat also must be applied to effect the sealing. The term "bonding material" as used herein means any type of material or thing which can be used to effect the bonding or connecting of the two adjacent portions of the sheet of material 10b to effect the connection or bonding described herein. The term "bonding material" also includes labels, bands, ribbons, strings, tape, staples or combinations thereof. Some of the bonding materials would secure the ends of the sheet of material 10b while other bonding materials may bind the circumference of a decorative wrapper 36b formed from the sheet of material 10b.

The sheet of material 10b is wrapped (shown in FIG. 7) about the floral grouping 30 to form the decorative wrapper 36b in the same manner as described before with respect to wrapping the sheet of material 10 about the floral grouping 30 to form the decorative wrapper 36 as shown in FIG. 4 or the decorative wrapper 36a as shown in FIG. 5. A portion of the sheet of material 10b near the second side 14b thereof overlaps portions of the sheet of material 10b near the second end 18b thereof when wrapped about the floral grouping 30 and the bonding material 42 bondingly engages the overlapping portions of the sheet of material 10b and bondingly connects the overlapping portions of the sheet of material 10b to secure the sheet of material 10b in the form of the decorative wrapper 36b as shown in FIG. 7. At least a portion of the embossed pattern 24b and at least a portion of the printed pattern 29b are visible on an outer peripheral surface 39b of the decorative wrapper 36b.

Sheets of material with bonding material thereon for wrapping about a floral grouping are disclosed in U.S. Pat. No. 5,111,637; issued May 12, 1992, entitled, "Method For Wrapping A Floral Grouping"; U.S. Pat. No. 5,111,638, issued May 12, 1992, entitled, "Method For Wrapping an Object With A Material Having Pressure Sensitive Adhesive Thereon" and U.S. Pat. No. 5,181,364, issued Jan. 26, 1993, entitled, "Wrapping A Floral Grouping With Sheets Having Adhesive or Cohesive Material Applied" and the descriptions in these patents are specifically incorporated herein by reference.

Embodiment of FIG. 8

Shown in FIG. 8 schematically is a system 43 for embossing the sheet of material 10 or 10b to provide the embossed pattern 24 or 24b and for printing a color or colors on the sheet of material 10a or 10b to provide the printed pattern 29 or 29b. A roll of material 44 may be constructed of any flexible material capable of being cut into sheets of material and wrapped about a floral grouping. Preferably, the roll of material 44 is constructed of paper, polymeric film, metallized film, foil, or laminations or combinations thereof.

The roll of material 44 is rollingly supported, and one end of the roll of material 44 is passed between a pair of embossing rollers 46 and 48. The embossing roller 46 has a plurality of raised portions 50 and a plurality of depressed portions 51 (only one of the raised portions 50 and one of the depressed portions 51 being designated by the reference numerals in FIG. 8). The embossing roller 48 has a plurality of depressed portions 52 and a plurality of raised portions 53 (only one of the depressed portions 52 and one of the raised portions 53 being designated by the reference numerals in FIG. 8). The depressed portions 52 are arranged on the embossing roller 48 to correspond and register with the raised portions 50 on the embossing roller 46. In a similar manner, the depressed portions 51 are arranged on the embossing roller 46 to correspond and register with the raised portions 53 on the embossing roller 48.

An ink roller 54 is disposed near the embossing roller 46. The ink roller 54 is positioned to apply ink to the raised portions 50 of the embossing roller 46.

One end 55 of the roll of material 44 is passed between the embossing rollers 46 and 48 in the direction indicated by the arrow 56, and the embossing rollers 46 and 48 are rotated in the respective directions indicated by the arrows 58 and 60. As the roll of material 44 is passed between the embossing rollers 46 and 48, the raised portions 50 of the embossing roller 46 engage the roll of material 44 and force the roll of material 44 into the corresponding depressed portion 52 of the embossing roller 48, thereby forming raised and depressed portions, such as the raised portions 26 and depressed portions 28 depicted in the sheet of material 10 (FIGS. 1–3). The ink roller 54 rotates in a direction indicated by the arrow 62 and applies ink to the raised portions 50 of the embossing roller 46. The raised portions 50 of the embossing roller 46 having the ink thereon transfer the ink to the roll of material 44, thereby providing the printed pattern 29 by applying a color to the depressed portions 28 of the sheet of material 10, wherein the printed pattern 29 is provided simultaneously with the forming of the raised portions 26 and depressed portions 28 of the embossed pattern 24 provided on the sheet of material 10. In this manner, the printed pattern 29 is provided in register with the embossed pattern 24.

A portion of the roll of material 44 then is passed under a knife 64. After a predetermined amount of the roll of material 44 is passed under the knife 64, the knife 64 is moved to engage and cut the sheet of material 10 or 10b from the roll of material 44.

The embossing rollers 46 and 48 each may be constructed of any suitable material capable of maintaining the raised and depressed portions 50 and 51 of the embossing roller 46 and the depressed and raised portions 52 and 53 of the embossing roller 48. Preferably, however, the embossing rollers 46 and 48 are constructed of a metal. In some instances, an embossing roller 48 constructed of paper may be used and, in this instance, it is not necessary to preform the depressed portions 52 in the embossing roller 48 as the depressed portions 52 will somewhat automatically be formed by the raised portions 50 of the embossing roller 46 engaging the paper embossing roller 48 and depressing the engaged portions of the paper embossing roller 48.

It should be noted that the ink roller 54 could be positioned to apply ink to the depressed portions 52 of the embossing roller 48 or the corresponding raised portions 53 on the embossing roller 48 if desired in a particular application. Alternatively, the ink roller 54 may not interact with either of the embossing rollers 46 and 48 and may provide the printed pattern 29 to the material by directly interacting with the material withdrawn from the roll of material 44, as discussed in further detail below.

Figure 9:
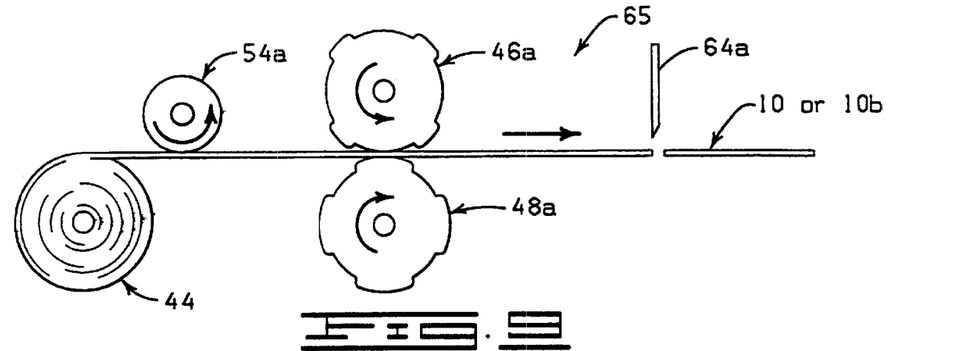
FIG. 9 is a schematic view, similar to FIG. 8, but showing a modified system for embossing a pattern on the sheets of material described herein and printing a pattern on the sheets of material wherein the printed pattern is out of register with the embossed pattern.

Embodiment of FIG. 9

Shown in FIG. 9 is a system 65 for forming the embossed pattern 24 or 24b on the respective sheets of material 10 or 10b. The system 65 is similar to the system 43 described hereinbefore with respect to FIG. 8, except as described herein below.

In the system 65 shown in FIG. 9, an ink roller 54a is disposed upstream of embossing rollers 46a and 48a to apply a color or colors which provide the printed pattern 29 to the roll of material 44 prior to the roll of material 44 being embossed by the embossing rollers 46a and 48a to provide the embossed pattern 24. Otherwise, the system 65 shown in FIG. 9 operates in a manner similar to the system 43 hereinbefore described with reference to FIG. 8.

It should be noted that the ink roller 54a could be positioned past the embossing rollers 46a and 48a so that the printed pattern 29 is applied to the sheet of material 10 or 10b after the embossed pattern 24 or 24b has been depressed thereon by the embossing rollers 46a and 48a. It also should be noted that an additional ink roller could be included for applying a second printed pattern (not shown) to the opposite surface of the sheet of material 10 or 10b if desired in a particular application.

By applying the printed pattern 29 prior to or following the embossing of the embossing pattern 24, the printed pattern 29 may be applied in register with the embossed pattern 24 or out of register with the embossed pattern 24. Alternatively, a portion of the printed pattern 29 may be applied in register with the embossed pattern 24, while a portion of the printed pattern 29 may be applied out of register with the embossed pattern 24.

Systems for embossing sheets of material are well known in the art, and a detailed description of such systems and the embossing roller or ink rollers used therein is not deem necessary herein.

Following application of the printed pattern 29 and the embossed pattern 24 to the roll of material 44, a portion of the roll of material 44 is passed under a knife 64a, and the knife 64a is moved to engage and cut the sheet of material 10 or 10b from the roll of material 44.

Figure 10:
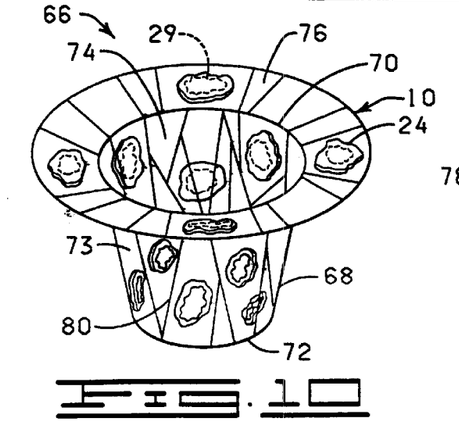
FIG. 10 is a perspective view of a pot cover constructed using the sheet of material shown in FIG. 1.
Figure 11:
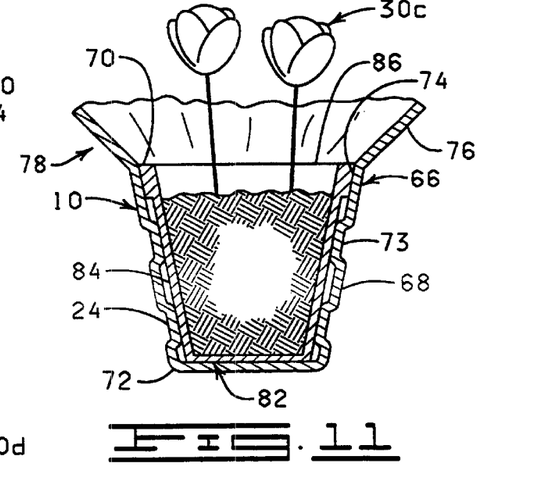
FIG. 11 is a cross-sectional view showing the pot cover of FIG. 10 disposed about a flower pot having a floral grouping disposed therein.

Embodiment of FIGS. 10 and 11

Shown in FIGS. 10 and 11 is a pot cover 66 which is formed from the sheet of material 10 shown in FIG. 1. The pot cover 66 includes a base 68 having an upper end 70, a lower end 72 and an outer peripheral surface 73. An object opening 74 is formed through the upper end 70 of the base 68 of the pot cover 66, and the object opening 74 extends a distance between the upper end 70 and the lower end 72 of the base 68 of the pot cover 66. The object opening 74 is sized to receive a pot or flower pot. A skirt 76 is formed on the upper end 70 of the base 68 of the pot cover 66, and the skirt 76 extends a distance outwardly from the upper end 70 of the base 68 of the pot cover 66.

At least a portion of the embossed pattern 24 provided on the sheet of material 10 from which the pot cover 66 is constructed is visible on at least one of the outer peripheral surface 73 of the base 68 of the pot cover 66 and the skirt 76 of the pot cover 66. When the sheet of material 10 from which the pot cover 66 is constructed is provided with a decorative printed pattern 29, at least a portion of the decorative printed pattern 29 is visible on the outer peripheral surface 73 of the base 68 and/or the skirt 76b of the pot cover 66.

The pot cover 66 is formed by placing the sheet of material 10 between a male die and a female die. The dies are brought together with the sheet of material 10 being disposed therebetween to form the sheet of material 10 into the pot cover 66 (not shown). During this forming process, a plurality of overlapping folds 80 are formed in the base 68 of the pot cover 66. The overlapping folds 80 extend at various and different distances and at various and different angles over the base 68 of the pot cover 66.

The system for forming the pot cover 66 is described in detail in U.S. Pat. No. 4,772,183, entitled, "Article Forming System", issued Sep. 27, 1988, the Specification of such patent specifically being expressly incorporated herein by reference.

As shown in FIG. 11, a flower pot 82 is disposed in the object opening 74 of the pot cover 66. The base 68 of the pot cover 66 covers a substantial portion of an outer peripheral surface 84 of the flower pot 82. The skirt 76 of the pot cover 66 extends a distance outwardly and upwardly from an upper end 86 of the flower pot 82. The flower pot 82 has a floral grouping 30c disposed therein, and the floral grouping 30c extends a distance upwardly from the upper end 86 of the flower pot 82. The pot cover 66 provides a decorative covering 78 for the flower pot 82.

Figure 12:
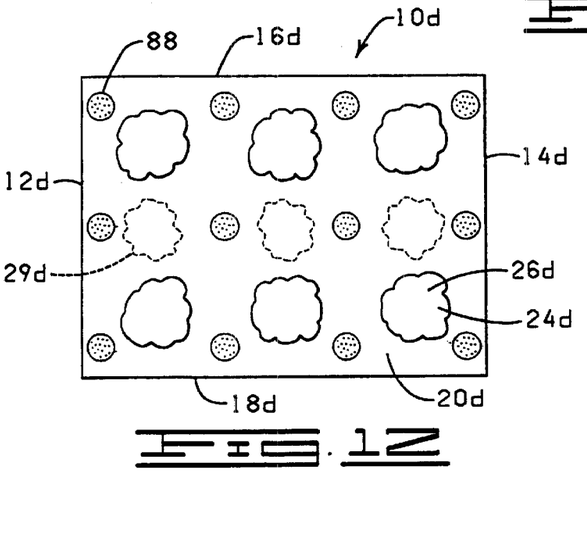
FIG. 12 is a top plan view of another sheet of material which is similar to the sheet of material shown in FIG. 1, but having a plurality of spots of bonding material disposed thereon.
Figure 13:
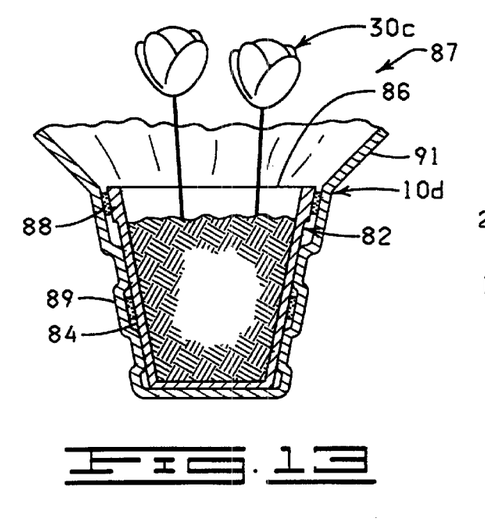
FIG. 13 is a cross-sectional view showing the sheet of material of FIG. 12 wrapped about a flower pot having a floral grouping disposed therein wherein the spots of bonding material secure the sheet of material to the flower pot.

Embodiment of FIGS. 12 and 13

Shown in FIG. 12 is a modified sheet of material 10d which is constructed similar to the sheet of material 10 shown in FIG. 1, except as described hereinbelow. The sheet of material 10d has a first side 12d, a second side 14d, a first end 16d, a second end 18d, an upper surface 20d and a lower surface 22d. At least a portion of at least one of the upper and lower surfaces 20d and 22d of the sheet of material 10d is provided with an embossed pattern 24d, and at least a portion of at least one of the upper & lower surfaces 20d & 22d of the sheet of material 10d is provided with a printed pattern 29d. In FIG. 12, the printed pattern 29d is depicted as disposed on the lower surface 22d of the sheet of material 10d and out of register with the embossed pattern 24d.

The sheet of material 10d also includes a plurality of spaced apart spots of bonding material 88 disposed on at least a portion of the upper surface 20d thereof. It should be noted that in lieu of the spots of bonding material 88, the bonding material 88 could be applied to at least a portion of the upper surface 20d of the sheet of material 10d in the form of strips or any other geometric shape, and the bonding material 88 may be applied only on the raised portions 26d of the embossed pattern 24d, or the bonding material 88 may be incorporated in the ink applied to the upper surface 20d of the sheet of material 10d in the form of the decorative printed pattern 29.

In FIG. 12, the embossed pattern 24d and the printed pattern 29d are illustrated as being out of register with one another. However, it will be understood that the embossed pattern 24d and the printed pattern 29d may be in register with one another, or a portion of the embossed pattern 24d may be in register with the printed pattern 29d and a portion of the embossed pattern 24d may be out of register with the printed pattern 29d.

In operation, the flower pot 82 is placed on the upper surface 20d of the sheet of material 10d. In this position, the sheet of material 10d is formed about the outer peripheral surface 84 of the flower pot 82 (shown in FIG. 13) such that the sheet of material 10d substantially encompasses and covers the outer peripheral surface 84 of the flower pot 82, thereby providing a decorative covering 87 for the flower pot 82. The bonding material 88 is brought into engagement with the outer peripheral surface 84 of the flower pot 82 as the sheet of material 10d is formed about the flower pot 82 to provide the decorative covering 87. The bonding material 88 bondingly engages the outer peripheral surface 84 of the flower pot 82 so as to bondingly connect the sheet of material 10d to the outer peripheral surface 84 of the flower pot 82. As the sheet of material 10d conforms to the shape of the outer peripheral surface 84 of the flower pot 82, a base portion 89 of the decorative covering 87 is formed. A portion of the sheet of material 10d extends outwardly and upwardly from the upper end 86 of the flower pot 82 to form a skirt portion 91 of the decorative covering 87 formed from the sheet of material 10d.

It also should be noted that the bonding material 88 may be applied to the lower surface 22d of the sheet of material 10d (not shown). In this instance, the sheet of material 10d would be applied to the flower pot 82 in a manner similar to that described before, except the flower pot 82 would be adjacent the lower surface 22d of the sheet of material 10d such that the lower surface 22d would be positioned adjacent the outer peripheral surface 84 of the flower pot 82.

Embodiment of FIGS. 14, 14a, 15, 16 and 17

Figure 14:
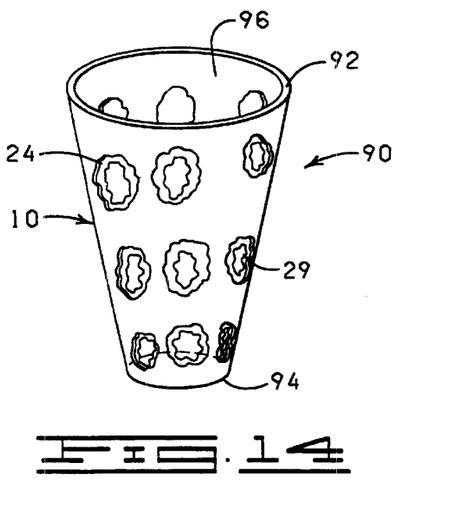
FIG. 14 is a perspective view showing a plant sleeve having an embossed pattern thereon.

Shown in FIG. 14 is a sleeve 90 for a flower pot or floral grouping, the sleeve 90 constructed from the sheet of material 10 having printed and embossed patterns 29 and 24, respectively, as shown in FIG. 1 and described in detail before. The sleeve 90 has an upper end 92 and a lower end 94. The sleeve 90 is frusto-conically shaped and has an opening 96 extending therethrough intersecting the upper end 92 and the lower end 94 thereof.

The sleeve 90 may be constructed by taking the sheet of material 10 shown in FIG. 1 and cutting the sheet of material 10 in the form of two trapezoidally shaped sheets and then connecting the two sheets together along two edges of each sheet to form the frusto-conically shaped sleeve 90 shown in FIG. 14. In the alternative, two rolls of material having the embossed pattern 24 and the printed pattern 29 thereon may be connected at spaced apart places to form the frusto-conically shaped sleeves 90, and then the formed frusto-conically shaped sleeves 90 may then be separated from the combined materials. There are various commercially available methods for forming sleeves such as the sleeve 90, and any of these commercially available methods or systems can be used to form the sleeve 90. These prior art systems for forming the sleeve 90 are well known in the art, and a detailed description of the apparatus and methods for forming the sleeve 90 is not deemed necessary herein.

Figure 14A:
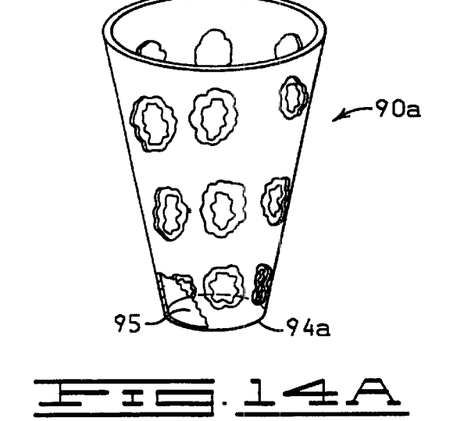
FIG. 14a is a partially cut away perspective view showing a plant sleeve having an embossed pattern thereon and a closed lower end.

Shown in FIG. 14a is a sleeve 90a similar to the sleeve 90 shown in FIG. 14 and described hereinbefore, except that a lower end 94a of the sleeve 90a is closed, thereby forming a closed bottom 95 of the sleeve 90a. While the uses of sleeve 90 will be described in detail hereinafter, it will be understood that sleeve 90a may be used in a similar manner.

Figure 15:
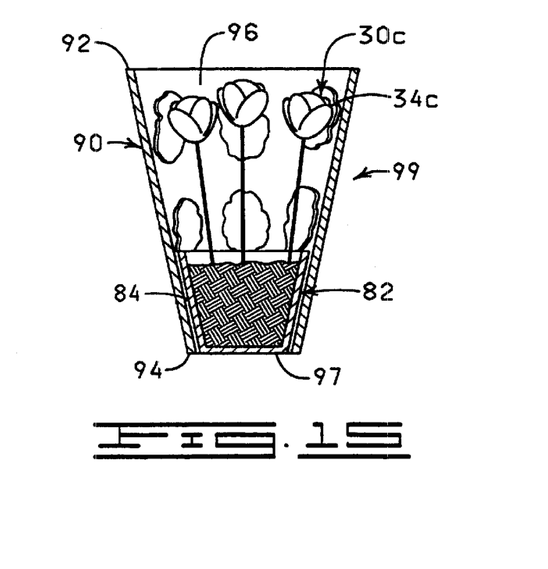
FIG. 15 is a cross-sectional view showing the plant sleeve of FIG. 14 disposed about a flower pot having a floral grouping disposed therein.

As shown in FIG. 15, the flower pot 82 with the floral grouping 30c disposed therein is disposed in the opening 96 of the sleeve 90. The flower pot 82 is positioned near the lower end 94 of the sleeve 90, and the sleeve 90 substantially encompasses the outer peripheral surface 84 of the flower pot 82, except for a bottom 97 of the flower pot 82 which is disposed adjacent the open lower end 94 of the sleeve 90. A portion of the sleeve 90 also encompasses and surrounds the floral grouping 30c disposed in the flower pot 82. Preferably, a portion of the sleeve 90 extends above the bloom end 34c of the floral grouping 30c. The sleeve 90 provides a protective and a decorative covering 99 for the flower pot 82 and the floral grouping 30c disposed therein.

While the use of the sleeve 90 to provide a decorative covering 99 for the flower pot 82 has been described herein, it will be understood that the sleeve 90 may also be employed to provide a decorative covering for a floral grouping in a substantially similar manner as that described above in reference to providing the decorative covering 99 for the flower pot 82.

Figure 16:
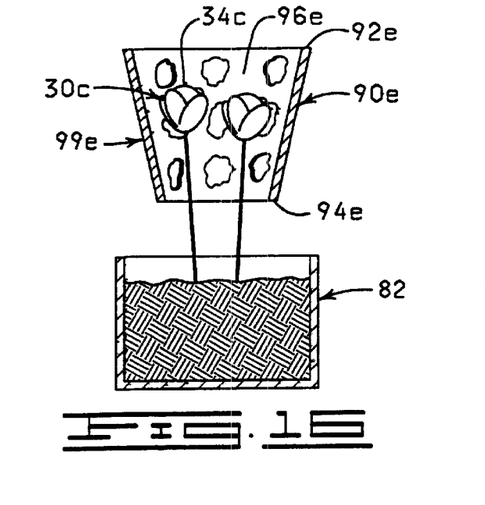
FIG. 16 is a cross-sectional view of a flower pot having a floral grouping therein with a modified plant sleeve disposed about a bloom end of the floral grouping.

Shown in FIG. 16 is a modified sleeve 90e which is constructed similar to the sleeve 90 shown in FIG. 14 and described in detail before, except the sleeve 90e is smaller than the sleeve 90 shown in FIG. 14 in that the distance between an upper end 92e and a lower end 94e of the sleeve 90e is less than the distance between the upper and lower ends 92 and 94 of the sleeve 90. The sleeve 90e is positioned over and encompasses only the bloom end 34c of the floral grouping 30c disposed in the flower pot 82 to provide a protective and a decorative covering 99e for the bloom end 34c of the floral grouping 30c with the bloom end 34c being disposed in an opening 96e of the sleeve 90e.

Figure 17:
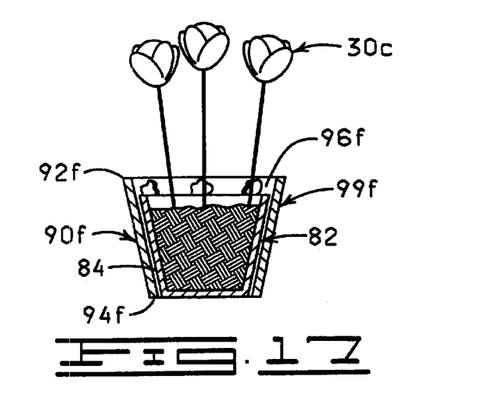
FIG. 17 is a cross-sectional view of a flower pot having a floral grouping disposed therein and having a modified plant sleeve disposed about the flower pot.

Shown in FIG. 17 is another modified sleeve 90f which is constructed similar to the sleeve 90e shown in FIG. 16, except the sleeve 90f is sized to surround and encompass the flower pot 82 rather than surrounding the bloom end 34c of the floral grouping 30c disposed in the flower pot 82. The sleeve 90f is sized to encompass substantially only the outer peripheral surface 84 of the flower pot 82 in such a manner that the floral grouping 30c disposed in the flower pot 82 is clearly visible, thereby providing a decorative covering 99f for the flower pot 82.

Figure 18:
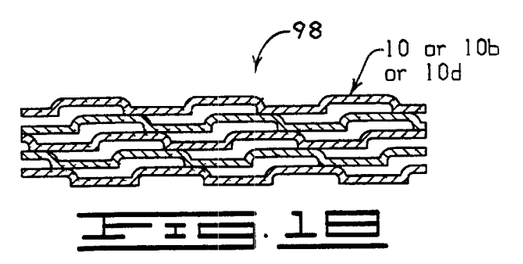
FIG. 18 is a cross-sectional view of a pad of material containing a plurality of sheets of material constructed in accordance with the present invention.

Embodiment of FIG. 18

Shown in FIG. 18 is a pad 98 of sheets of material 10, 10b or 10d with each of the sheets of material 10, 10b or 10d being constructed in a manner like that described before with respect to FIGS. 1, 6 or 12. In those instances where the sheets of material 10, 10b or 10d in the pad 98 are constructed like the sheet of material 10b or 10d shown in FIG. 6 or 12, the bonding material 42 or 88 bondingly and releasably connects each of the sheets of material 10b or 10d to the adjacent sheet of material 10b or 10d to form the pad 98. The sheets of material 10, 10b or 10d are disconnected or removed from the pad 98 and wrapped about the floral grouping 30 or the flower pot 82 in the manner described before with respect to FIGS. 1, 3–7 and 12–13. A pad of sheets of material for wrapping about floral groupings is disclosed and described in detail in U.S. Pat. No. 5,181,364, referred to before and expressly incorporated herein by reference.

Figure 19:
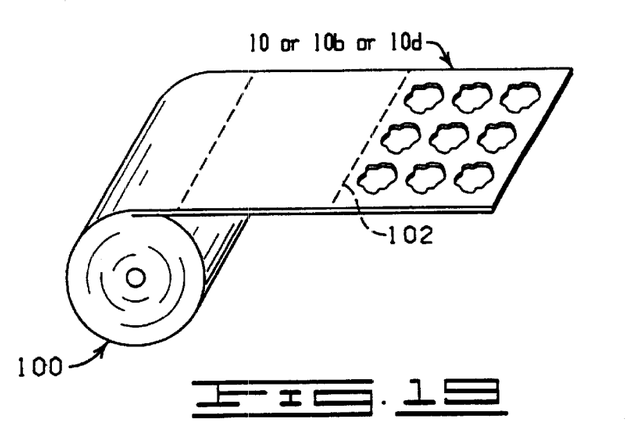
FIG. 19 is a perspective view of a roll of material formed of sheets of material constructed in accordance with the present invention wherein the sheets of material are separated from the roll of material by tearing along the lines of perforations.
Figure 20:
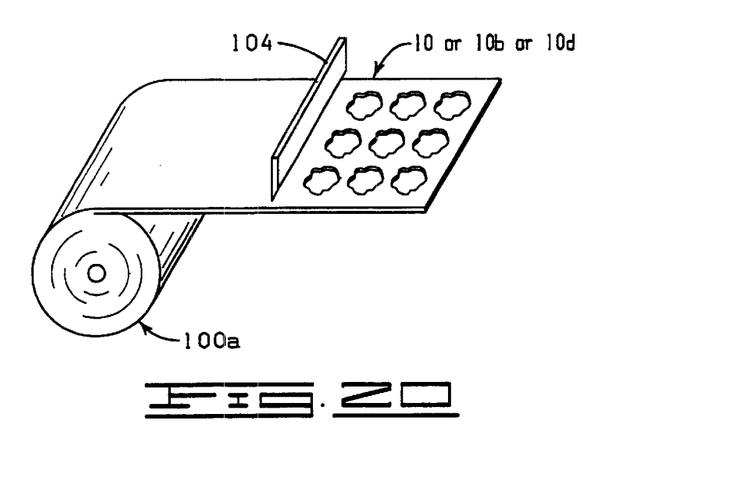
FIG. 20 is a perspective view of a roll of material formed of sheets of material constructed in accordance with the present invention wherein the sheets of material are separated from the roll of material by a knife.
Figure 21:
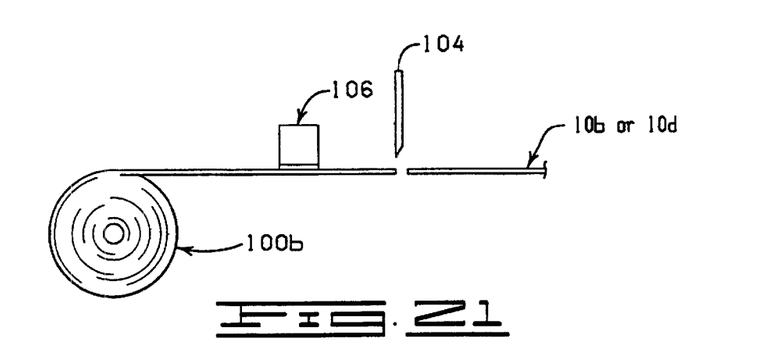
FIG. 21 is a schematic view showing a roll of material formed of sheets of material wherein a bonding material is applied to the roll of material and the sheets of material are cut from the roll of material by way of a knife.

Embodiment of FIGS. 19–21

Shown in FIG. 19 is a roll of material 100 containing a plurality of sheets of material, such as the sheet of material 10, 10b or 10d, separated by lines of perforations 102. In this embodiment, the material is unrolled from the roll of material 100 and the sheets of material 10, 10b or 10d are separated from the roll of material 100 by tearing along the lines of perforations 102.

Shown in FIG. 20 is a roll of material 100a which is constructed similar to the roll of material 100 shown in FIG. 19, except the roll of material 100a does not include the lines of perforations 102. In this embodiment, the material is unrolled from the roll of material 100a and, after a predetermined amount of material has been unrolled from the roll of material 100a, a knife 104 is activated or manually manipulated to cut the material from the roll of material 100a thereby separating a sheet of material 10, 10b or 10d from the roll of material 100a. The separated sheet of material 10, 10b or 10d is constructed similar to the sheets of material hereinbefore described with reference to FIGS. 1, 6 or 12, for example.

Shown in FIG. 21 is another roll of material 100b containing a plurality of sheets of material similar to the sheet of material 10, 10b or 10d described herein before with respect to FIGS. 1, 6 or 12. The roll of material 100b is constructed similar to the roll of material 100a shown in FIG. 20 and described in detail before. The material is unrolled from the roll of material 100b and passed through an adhesive applicator 106 where a bonding material is applied to the material to form a sheet of material containing a bonding material disposed on one surface thereof such as the sheet of material 10b having the bonding material 42 disposed on the upper surface 20d thereof or the sheet of material 10d having the bonding material 88 disposed on the upper surface 20d thereof, as described hereinbefore with reference to FIGS. 6 and 12, respectively. The material further is unrolled from the roll of material 100b and, after a predetermined amount of material has been unrolled from the roll of material 100b, the knife 104 is activated or manually manipulated to cut a sheet of material, such as the sheets of material 10b and 10d, from the roll of material 10b.

Changes may be made in the steps or the sequence of steps of the methods described herein without departing from the spirit and scope of the invention as defined in the following claims.

What is claimed is:

1. A method for wrapping a floral grouping, comprising:
providing a sheet of material having an upper surface, a lower surface, an embossed pattern formed on at least a portion of one of the upper and lower surfaces thereof and a printed pattern formed on at least a portion of one of the upper and lower surfaces thereof, the sheet of material being selected from the group consisting of paper, polymeric film, metallized film, foil, laminations thereof and combinations thereof;
providing a floral grouping having a stem end and a bloom end; and
wrapping the sheet of material about the floral grouping to provide a decorative wrapper having an upper end, a lower end and an outer peripheral surface, the decorative wrapper encompassing at least a portion of the floral grouping, and wherein at least a portion of the embossed pattern and at least a portion of the printed pattern provided on the sheet of material from which the decorative wrapper is constructed are visible on the outer peripheral surface of the decorative wrapper.

2. The method of claim 1 wherein, in the step of wrapping the sheet of material about the floral grouping to provide a decorative wrapper, the lower end of the decorative wrapper is open and the upper end of the decorative wrapper is open, and the floral grouping is positioned in the decorative wrapper whereby the decorative wrapper encompasses a substantial portion of the floral grouping, and the stem end of the floral grouping extends through the open lower end of the decorative wrapper and the bloom end of the floral grouping is exposed via the open upper end of the decorative wrapper.

3. The method of claim 1 wherein, in the step of wrapping the sheet of material about the floral grouping to provide a decorative wrapper, a portion of the sheet of material overlaps an adjacent portion of the sheet of material to form the decorative wrapper.

4. The method of claim 1 wherein, in the step of wrapping the sheet of material about the floral grouping to provide a decorative wrapper, the decorative wrapper has a conical shape.

5. The method of claim 1 wherein, in the step of providing the sheet of material, the embossed pattern is in register with the printed pattern.

6. The method of claim 1 wherein, in the step of providing the sheet of material, the embossed pattern is out of register with the printed pattern.

7. The method of claim 1 wherein, in the step of providing the sheet of material, at least a portion of the embossed pattern is in register with at least a portion of the printed pattern.

8. A method for wrapping a floral grouping comprising:
providing a sheet of material having an upper surface, a lower surface and a printed pattern formed on at least a portion of one of the upper and lower surfaces thereof, the sheet of material being selected from the group consisting of paper, polymeric film, metallized film, foil, laminations thereof and combinations thereof;
embossing a pattern on at least a portion of one of the upper and lower surfaces of the sheet of material to provide an embossed pattern on the sheet of material;
providing a floral grouping having a bloom end and a stem end; and
wrapping the sheet of material about the floral grouping to provide a decorative wrapper having an upper end, a lower end and an outer peripheral surface, the decorative wrapper encompassing at least a portion of the floral grouping, wherein at least a portion of the embossed pattern and at least a portion of the printed pattern provided on the sheet of material from which the decorative wrapper is constructed are visible on the outer peripheral surface of the decorative wrapper.

9. The method of claim 8 wherein, in the step of wrapping the sheet of material about the floral grouping to provide a decorative wrapper, the lower end of the decorative wrapper is open and the upper end of the decorative wrapper is open, and the floral grouping is positioned in the decorative wrapper whereby the decorative wrapper encompasses a substantial portion of the floral grouping, and the stem end of the floral grouping extends through the open lower end of the decorative wrapper and the bloom end of the floral grouping is exposed via the open upper end of the decorative wrapper.

10. The method of claim 8 wherein, in the step of wrapping the sheet of material about the floral grouping to provide a decorative wrapper, a portion of the sheet of material overlaps an adjacent portion of the sheet of material to form the decorative wrapper.

11. The method of claim 8 wherein, in the step of wrapping the sheet of material about the floral grouping to provide a decorative wrapper, the decorative wrapper has a conical shape.

12. The method of claim 8 wherein, in the step of providing the sheet of material, the embossed pattern is in register with the printed pattern.

13. The method of claim 8 wherein, in the step of providing the sheet of material, the embossed pattern is out of register with the printed pattern.

14. The method of claim 8 wherein, in the step of providing the sheet of material, at least a portion of the embossed pattern is in register with at least a portion of the printed pattern.

15. A method for wrapping a floral grouping comprising:
providing a sheet of material having an upper surface and a lower surface, the sheet of material being selected from the group consisting of paper, polymeric film, metallized film, foil, laminations thereof and combinations thereof;
embossing a pattern on at least a portion of one of the upper and lower surfaces of the sheet of material to provide an embossed pattern on the sheet of material;

printing a pattern on at least a portion of one of the upper and lower surfaces of the sheet of material to provide a printed pattern on the sheet of material;

providing a floral grouping having a bloom end and a stem end; and wrapping the sheet of material about the floral grouping to provide a decorative wrapper having an upper end, a lower end and an outer peripheral surface, the decorative wrapper encompassing at least a portion of the floral grouping, wherein at least a portion of the embossed pattern and at least a portion of the printed pattern provided on the sheet of material from which the decorative wrapper is constructed are visible on the outer peripheral surface of the decorative wrapper.

16. The method of claim 15 wherein, in the step of wrapping the sheet of material about the floral grouping to provide a decorative wrapper, the lower end of the decorative wrapper is open and the upper end of the decorative wrapper is open, and the floral grouping is positioned in the decorative wrapper whereby the decorative wrapper encompasses a substantial portion of the floral grouping, and the stem end of the floral grouping extends through the open lower end of the decorative wrapper and the bloom end of the floral grouping is exposed via the open upper end of the decorative wrapper.

17. The method of claim 15 wherein, in the step of wrapping the sheet of material about the floral grouping to provide a decorative wrapper, a portion of the sheet of material overlaps an adjacent portion of the sheet of material to form the decorative wrapper.

18. The method of claim 15 wherein, in the step of wrapping the sheet of material about the floral grouping to provide a decorative wrapper, the decorative wrapper has a conical shape.

19. The method of claim 15 wherein the embossed pattern on the sheet of material is in register with the printed pattern on the sheet of material.

20. The method of claim 15 wherein the embossed pattern on the sheet of material is out of register with the printed pattern on the sheet of material.

21. The method of claim 15 wherein at least a portion of the embossed pattern on the sheet of material is in register with at least a portion of the printed pattern on the sheet of material.

22. A method for wrapping a floral grouping comprising:

providing a roll of material having an upper surface, a lower surface, an embossed pattern embossed on at least a portion of one of the upper and lower surfaces thereof, and a printed pattern printed on at least a portion of one of the upper and lower surfaces thereof, the roll of material being selected from the group consisting of paper, polymeric film, metallized film, foil, laminations thereof and combinations thereof;

providing a floral grouping having a stem end and a bloom end;

unrolling material from the roll of material until a predetermined amount of material has been unrolled from the roll of material;

separating a portion of the unrolled material from the roll of material to provide a sheet of material having an embossed pattern and a printed pattern thereon; and wrapping the sheet of material about the floral grouping to provide a decorative wrapper having an upper end, a lower end and an outer peripheral surface, the decorative wrapper encompassing at least a portion of the floral grouping, wherein at least a portion of the embossed pattern and at least a portion of the printed pattern provided on the sheet of material from which the decorative wrapper is constructed are visible on the outer peripheral surface of the decorative wrapper.

23. The method of claim 22 wherein, in the step of wrapping the sheet of material about the floral grouping to provide a decorative wrapper, the lower end of the decorative wrapper is open and the upper end of the decorative wrapper is open, and the floral grouping is positioned in the decorative wrapper whereby the decorative wrapper encompasses a substantial portion of the floral grouping, and the stem end of the floral grouping extends through the open lower end of the decorative wrapper and the bloom end of the floral grouping is exposed via the open upper end of the decorative wrapper.

24. The method of claim 22 wherein, in the step of wrapping the sheet of material about the floral grouping to provide a decorative wrapper, a portion of the sheet of material overlaps an adjacent portion of the sheet of material to form the decorative wrapper.

25. The method of claim 22 wherein, in the step of wrapping the sheet of material about the floral grouping to provide a decorative wrapper, the decorative wrapper has a conical shape.

26. The method of claim 22 wherein the embossed pattern on the roll of material is in register with the printed pattern on the roll of material.

27. The method of claim 22 wherein the embossed pattern on the roll of material is out of register with the printed pattern on the roll of material.

28. The method of claim 22 wherein at least a portion of the embossed pattern on the roll of material is in register with at least a portion of the printed pattern on the roll of material.

29. A method for wrapping a floral grouping comprising:

providing a floral grouping having a stem end and a bloom end;

providing a roll of material having an upper surface, a lower surface and a printed pattern formed on at least a portion of one of the upper and lower surfaces thereof, the roll of material being selected from the group consisting of paper, polymeric film, metallized film, foil, laminations thereof and combinations thereof;

embossing a pattern on at least a portion of one of the upper and lower surfaces of the roll of material to provide an embossed pattern on the roll of material;

unrolling material from the roll of material until a predetermined amount of material has been unrolled from the roll of material;

separating a portion of the unrolled material from the roll of material to provide a sheet of material having an embossed pattern and a printed pattern thereon; and wrapping the sheet of material about the floral grouping to provide a decorative wrapper having an upper end, a lower end and an outer peripheral surface, the decorative wrapper encompassing at least a portion of the floral grouping, wherein at least a portion of the embossed pattern and at least a portion of the printed pattern provided on the sheet of material from which the decorative wrapper is constructed are visible on the outer peripheral surface of the decorative wrapper.

30. The method of claim 29 wherein, in the step of wrapping the sheet of material about the floral grouping to provide a decorative wrapper, the lower end of the decorative wrapper is open and the upper end of the decorative wrapper is open, and the floral grouping is positioned in the decorative wrapper whereby the decorative wrapper encompasses a substantial portion of the floral grouping, and the stem end of the floral grouping extends through the open lower end of the decorative wrapper and the bloom end of the floral grouping is exposed via the open upper end of the decorative wrapper.

31. The method of claim 29 wherein, in the step of wrapping the sheet of material about the floral grouping to provide a decorative wrapper, a portion of the sheet of material overlaps an adjacent portion of the sheet of material to form the decorative wrapper.

32. The method of claim 29 wherein, in the step of wrapping the sheet of material about the floral grouping to provide a decorative wrapper, the decorative wrapper has a conical shape.

33. The method of claim 29 wherein the embossed pattern on the roll of material is in register with the printed pattern on the roll of material.

34. The method of claim 29 wherein the embossed pattern on the roll of material is out of register with the printed pattern on the roll of material.

35. The method of claim 29 wherein at least a portion of the embossed pattern on the roll of material is in register with at least a portion of the printed pattern on the roll of material.

36. A method for wrapping a floral grouping comprising:
providing a floral grouping having a stem end and a bloom end;
providing a roll of material having an upper surface and a lower surface, the roll of material being selected from the group consisting of paper, polymeric film, metallized film, foil, laminations thereof and combinations thereof;
embossing a pattern on at least a portion of one of the upper and lower surfaces of the roll of material to provide an embossed pattern on the roll of material;
printing a pattern on at least a portion of one of the upper and lower surfaces of the roll of material to provide a printed pattern on the roll of material;
unrolling material from the roll of material until a predetermined amount of material has been unrolled from the roll of material;
separating a portion of the unrolled material from the roll of material to provide a sheet of material having an embossed pattern and a printed pattern thereon; and
wrapping the sheet of material about the floral grouping to provide a decorative wrapper having an upper end, a lower end and an outer peripheral surface, the decorative wrapper encompassing at least a portion of the floral grouping, wherein at least a portion of the embossed pattern and at least a portion of the printed pattern provided on the sheet of material from which the decorative wrapper is constructed are visible on the outer peripheral surface of the decorative wrapper.

37. The method of claim 36 wherein, in the step of wrapping the sheet of material about the floral grouping to provide a decorative wrapper, the lower end of the decorative wrapper is open and the upper end of the decorative wrapper is open, and the floral grouping is positioned in the decorative wrapper whereby the decorative wrapper encompasses a substantial portion of the floral grouping, and the stem end of the floral grouping extends through the open lower end of the decorative wrapper and the bloom end of the floral grouping is exposed via the open upper end of the decorative wrapper.

38. The method of claim 36 wherein, in the step of wrapping the sheet of material about the floral grouping to provide a decorative wrapper, a portion of the sheet of material overlaps an adjacent portion of the sheet of material to form the decorative wrapper.

39. The method of claim 36 wherein, in the step of wrapping the sheet of material about the floral grouping to provide a decorative wrapper, the decorative wrapper has a conical shape.

40. The method of claim 36 wherein the embossed pattern on the roll of material is in register with the printed pattern on the roll of material.

41. The method of claim 36 wherein the embossed pattern on the roll of material is out of register with the printed pattern on the roll of material.

42. The method of claim 36 wherein at least a portion of the embossed pattern on the roll of material is in register with at least a portion of the printed pattern on the roll of material.

43. A method for wrapping a floral grouping comprising:
providing a sheet of material having an upper surface, a lower surface, an embossed pattern formed on at least a portion of one of the upper and lower surfaces thereof, a printed pattern formed on at least a portion of one of the upper and lower surfaces thereof, and a bonding material disposed on at least a portion of one of the upper and lower surfaces thereof, the sheet of material being selected from the group consisting of paper, polymeric film, metallized film, foil, laminations thereof and combinations thereof;
providing a floral grouping having a stem end and a bloom end; and
wrapping the sheet of material about the floral grouping to provide a decorative wrapper having an upper end, a lower end and an outer peripheral surface, the decorative wrapper encompassing at least a portion of the floral grouping, wherein at least a portion of the embossed pattern and at least a portion of the printed pattern provided on the sheet of material from which the decorative wrapper is constructed are visible on the outer peripheral surface of the decorative wrapper, a portion of the sheet of material having the bonding material thereon overlapping another portion of the sheet of material and the bonding material bondingly engaging the overlapping portions of the sheet of material and bondingly connecting the overlapping portions of the sheet of material to secure the sheet of material in the form of the decorative wrapper.

44. The method of claim 43 wherein, in the step of wrapping the sheet of material about the floral grouping to provide a decorative wrapper, the lower end of the decorative wrapper is open and the upper end of the decorative wrapper is open, and the floral grouping is positioned in the decorative wrapper whereby the decorative wrapper encompasses a substantial portion of the floral grouping, and the stem end of the floral grouping extends through the open lower end of the decorative wrapper and the bloom end of the floral grouping is exposed via the open upper end of the decorative wrapper.

45. The method of claim 43 wherein, in the step of wrapping the sheet of material about the floral grouping to provide a decorative wrapper, the decorative wrapper has a conical shape.

46. The method of claim 43 wherein, in the step of providing a sheet of material, the bonding material is a pressure sensitive adhesive.

47. The method of claim 43 wherein the embossed pattern on the sheet of material is in register with the printed pattern on the sheet of material.

48. The method of claim 43 wherein the embossed pattern on the sheet of material is out of register with the printed pattern on the sheet of material.

49. The method of claim 43 wherein at least a portion of the embossed pattern on the sheet of material is in register with at least a portion of the printed pattern on the sheet of material.

50. A method for wrapping a floral grouping comprising:
providing a sheet of material having an upper surface, a lower surface, a printed pattern formed on at least a portion of one of the upper and lower surfaces thereof, and a bonding material disposed on at least a portion of one of the upper and lower surfaces thereof, the sheet of material being selected from the group consisting of paper, polymeric film, metallized film, foil, laminations thereof and combinations thereof;
embossing a pattern on at least a portion of one of the upper and lower surfaces of the sheet of material to provide an embossed pattern on the sheet of material;
providing a floral grouping having a stem end and a bloom end; and
wrapping the sheet of material about the floral grouping to provide a decorative wrapper having an upper end, a lower end and an outer peripheral surface, the decorative wrapper encompassing at least a portion of the floral grouping, wherein at least a portion of the embossed pattern and at least a portion of the printed pattern provided on the sheet of material from which the decorative wrapper is constructed are visible on the outer peripheral surface of the decorative wrapper, a portion of the sheet of material having the bonding material thereon overlapping another portion of the sheet of material and the bonding material bondingly engaging the overlapping portions of the sheet of material and bondingly connecting the overlapping portions of the sheet of material to secure the sheet of material in the form of the decorative wrapper.

51. The method of claim 50 wherein, in the step of wrapping the sheet of material about the floral grouping to provide a decorative wrapper, the lower end of the decorative wrapper is open and the upper end of the decorative wrapper is open, and the floral grouping is positioned in the decorative wrapper whereby the decorative wrapper encompasses a substantial portion of the floral grouping, and the stem end of the floral grouping extends through the open lower end of the decorative wrapper and the bloom end of the floral grouping is exposed via the open upper end of the decorative wrapper.

52. The method of claim 50 wherein, in the step of wrapping the sheet of material about the floral grouping to provide a decorative wrapper, the decorative wrapper has a conical shape.

53. The method of claim 50 wherein, in the step of providing a sheet of material, the bonding material is a pressure sensitive adhesive.

54. The method of claim 50 wherein the embossed pattern on the sheet of material is in register with the printed pattern on the sheet of material.

55. The method of claim 50 wherein the embossed pattern on the sheet of material is out of register with the printed pattern on the sheet of material.

56. The method of claim 50 wherein at least a portion of the embossed pattern on the sheet of material is in register with at least a portion of the printed pattern on the sheet of material.

57. A method for wrapping a floral grouping comprising:
providing a sheet of material having an upper surface, a lower surface, and a bonding material disposed on at least a portion of one of the upper and lower surfaces thereof, the sheet of material being selected from the group consisting of paper, polymeric film, metallized film, foil, laminations thereof and combinations thereof;
embossing a pattern on at least a portion of one of the upper and lower surfaces of the sheet of material to provide an embossed pattern on the sheet of material;
printing a pattern on at least a portion of one of the upper and lower surfaces of the sheet of material to provide a printed pattern on the sheet of material;
providing a floral grouping having a stem end and a bloom end; and
wrapping the sheet of material about the floral grouping to provide a decorative wrapper having an upper end, a lower end and an outer peripheral surface, the decorative wrapper encompassing at least a portion of the floral grouping, wherein at least a portion of the embossed pattern and at least a portion of the printed pattern provided on the sheet of material from which the decorative wrapper is constructed are visible on the outer peripheral surface of the decorative wrapper, a portion of the sheet of material having the bonding material thereon overlapping another portion of the sheet of material and the bonding material bondingly engaging the overlapping portions of the sheet of material and bondingly connecting the overlapping portions of the sheet of material to secure the sheet of material in the form of the decorative wrapper.

58. The method of claim 57 wherein, in the step of wrapping the sheet of material about the floral grouping to provide a decorative wrapper, the lower end of the decorative wrapper is open and the upper end of the decorative wrapper is open, and the floral grouping is positioned in the decorative wrapper whereby the decorative wrapper encompasses a substantial portion of the floral grouping, and the stem end of the floral grouping extends through the open lower end of the decorative wrapper and the bloom end of the floral grouping is exposed via the open upper end of the decorative wrapper.

59. The method of claim 57 wherein, in the step of wrapping the sheet of material about the floral grouping to provide a decorative wrapper, the decorative wrapper has a conical shape.

60. The method of claim 57 wherein, in the step of providing a sheet of material, the bonding material is a pressure sensitive adhesive.

61. The method of claim 57 wherein the embossed pattern on the sheet of material is in register with the printed pattern on the sheet of material.

62. The method of claim 57 wherein the embossed pattern on the sheet of material is out of register with the printed pattern on the sheet of material.

63. The method of claim 57 wherein at least a portion of the embossed pattern on the sheet of material is in register with at least a portion of the printed pattern on the sheet of material.

64. A method for wrapping a floral grouping comprising:
providing a floral grouping having a stem end and a bloom end;
providing a roll of material having an upper surface, a lower surface, an embossed pattern embossed on at least a portion of one of the upper and lower surfaces thereof, a printed pattern printed on at least a portion of one of the upper and lower surfaces thereof, and a bonding material disposed on at least a portion of one of the upper and lower surfaces thereof, the roll of material being selected from the group consisting of paper, polymeric film, metallized film, foil, laminations thereof and combinations thereof;

unrolling material from the roll of material until a predetermined amount of material has been unrolled from the roll of material;

separating a portion of the unrolled material from the roll of material to provide a sheet of material having an embossed pattern and a printed pattern thereon; and wrapping the sheet of material about the floral grouping to provide a decorative wrapper having an upper end, a lower end and an outer peripheral surface, the decorative wrapper encompassing at least a portion of the floral grouping, wherein at least a portion of the embossed pattern and at least a portion of the printed pattern provided on the sheet of material from which the decorative wrapper is constructed are visible on the outer peripheral surface of the decorative wrapper, a portion of the sheet of material having the bonding material thereon overlapping another portion of the sheet of material and the bonding material bondingly engaging the overlapping portions of the sheet of material and bondingly connecting the overlapping portions of the sheet of material to secure the sheet of material in the form of the decorative wrapper.

65. The method of claim 64 wherein, in the step of wrapping the sheet of material about the floral grouping to provide a decorative wrapper, the lower end of the decorative wrapper is open and the upper end of the decorative wrapper is open, and the floral grouping is positioned in the decorative wrapper whereby the decorative wrapper encompasses a substantial portion of the floral grouping, and the stem end of the floral grouping extends through the open lower end of the decorative wrapper and the bloom end of the floral grouping is exposed via the open upper end of the decorative wrapper.

66. The method of claim 64 wherein, in the step of wrapping the sheet of material about the floral grouping to provide a decorative wrapper, the decorative wrapper has a conical shape.

67. The method of claim 64 wherein, in the step of providing a roll of material, the bonding material is a pressure sensitive adhesive.

68. The method of claim 64 wherein the embossed pattern on the roll of material is in register with the printed pattern on the roll of material.

69. The method of claim 64 wherein the embossed pattern on the roll of material is out of register with the printed pattern on the roll of material.

70. The method of claim 64 wherein at least a portion of the embossed pattern on the roll of material is in register with at least a portion of the printed pattern on the roll of material.

71. A method for wrapping a floral grouping comprising:

providing a floral grouping having a stem end and a bloom end;

providing a roll of material having an upper surface, a lower surface, a printed pattern formed on at least a portion of one of the upper and lower surfaces thereof and a bonding material disposed on at least a portion of one of the upper and lower surfaces thereof, the roll of material being selected from the group consisting of paper, polymeric film, metallized film, foil, laminations thereof and combinations thereof;

embossing a pattern on at least a portion of one of the upper and lower surfaces of the roll of material to provide an embossed pattern on the roll of material;

unrolling material from the roll of material until a predetermined amount of material has been unrolled from the roll of material;

separating a portion of the unrolled material from the roll of material to provide a sheet of material having an embossed pattern and a printed pattern thereon; and wrapping the sheet of material about the floral grouping to provide a decorative wrapper having an upper end, a lower end and an outer peripheral surface, the decorative wrapper encompassing at least a portion of the floral grouping, wherein at least a portion of the embossed pattern and at least a portion of the printed pattern provided on the sheet of material from which the decorative wrapper is constructed are visible on the outer peripheral surface of the decorative wrapper, a portion of the sheet of material having the bonding material thereon overlapping another portion of the sheet of material and the bonding material bondingly engaging the overlapping portions of the sheet of material and bondingly connecting the overlapping portions of the sheet of material to secure the sheet of material in the form of the decorative wrapper.

72. The method of claim 71 wherein, in the step of wrapping the sheet of material about the floral grouping to provide a decorative wrapper, the lower end of the decorative wrapper is open and the upper end of the decorative wrapper is open, and the floral grouping is positioned in the decorative wrapper whereby the decorative wrapper encompasses a substantial portion of the floral grouping, and the stem end of the floral grouping extends through the open lower end of the decorative wrapper and the bloom end of the floral grouping is exposed via the open upper end of the decorative wrapper.

73. The method of claim 71 wherein, in the step of wrapping the sheet of material about the floral grouping to provide a decorative wrapper, the decorative wrapper has a conical shape.

74. The method of claim 71 wherein, in the step of providing a roll of material, the bonding material is a pressure sensitive adhesive.

75. The method of claim 71 wherein the embossed pattern on the roll of material is in register with the printed pattern on the roll of material.

76. The method of claim 71 wherein the embossed pattern on the roll of material is out of register with the printed pattern on the roll of material.

77. The method of claim 71 wherein at least a portion of the embossed pattern on the roll of material is in register with at least a portion of the printed pattern on the roll of material.

78. A method for wrapping a floral grouping comprising:

providing a floral grouping having a stem end and a bloom end;

providing a roll of material having an upper surface, a lower surface and a bonding material disposed on at least a portion of one of the upper and lower surfaces thereof, the roll of material being selected from the group consisting of paper, polymeric film, metallized film, foil, laminations thereof and combinations thereof;

embossing a pattern on at least a portion of one of the upper and lower surfaces of the roll of material to provide an embossed pattern on the roll of material;

printing a pattern on at least a portion of one of the upper and lower surfaces of the roll of material to provide a printed pattern on the roll of material;

unrolling material from the roll of material until a predetermined amount of material has been unrolled from the roll of material;

separating a portion of the unrolled material from the roll of material to provide a sheet of material having an embossed pattern and a printed pattern thereon; and wrapping the sheet of material about the floral grouping to provide a decorative wrapper having an upper end, a lower end and an outer peripheral surface, the decorative wrapper encompassing at least a portion of the floral grouping, wherein at least a portion of the embossed pattern and at least a portion of the printed pattern provided on the sheet of material from which the decorative wrapper is constructed are visible on the outer peripheral surface of the decorative wrapper, a portion of the sheet of material having the bonding material thereon overlapping another portion of the sheet of material and the bonding material bondingly engaging the overlapping portions of the sheet of material and bondingly connecting the overlapping portions of the sheet of material to secure the sheet of material in the form of the decorative wrapper.

79. The method of claim 78 wherein, in the step of wrapping the sheet of material about the floral grouping to provide a decorative wrapper, the lower end of the decorative wrapper is open and the upper end of the decorative wrapper is open, and the floral grouping is positioned in the decorative wrapper whereby the decorative wrapper encompasses a substantial portion of the floral grouping, and the stem end of the floral grouping extends through the open lower end of the decorative wrapper and the bloom end of the floral grouping is exposed via the open upper end of the decorative wrapper.

80. The method of claim 78 wherein, in the step of wrapping the sheet of material about the floral grouping to provide a decorative wrapper, the decorative wrapper has a conical shape.

81. The method of claim 78 wherein, in the step of providing a roll of material, the bonding material is a pressure sensitive adhesive.

82. The method of claim 78 wherein the embossed pattern on the roll of material is in register with the printed pattern on the roll of material.

83. The method of claim 78 wherein the embossed pattern on the roll of material is out of register with the printed pattern on the roll of material.

84. The method of claim 78 wherein at least a portion of the embossed pattern on the roll of material is in register with at least a portion of the printed pattern on the roll of material.

* * * * *